(12) United States Patent
Streicher et al.

(10) Patent No.: US 11,174,935 B2
(45) Date of Patent: Nov. 16, 2021

(54) PRESSURE COMPENSATION DEVICE FOR A HOUSING, IN PARTICULAR OF A MOTOR VEHICLE, AND COMPONENT FOR A MOTOR VEHICLE

(71) Applicant: AUDI AG, Ingolstadt (DE)

(72) Inventors: Michael Streicher, Ingolstadt (DE); Marco Utschig, Apolda (DE)

(73) Assignee: AUDI AG, Ingolstadt (DE)

( * ) Notice: Subject to any disclaimer, the term of this patent is extended or adjusted under 35 U.S.C. 154(b) by 713 days.

(21) Appl. No.: 16/077,831

(22) PCT Filed: Feb. 17, 2017

(86) PCT No.: PCT/EP2017/053669
§ 371 (c)(1),
(2) Date: Aug. 14, 2018

(87) PCT Pub. No.: WO2017/144370
PCT Pub. Date: Aug. 31, 2017

(65) Prior Publication Data
US 2021/0190197 A1    Jun. 24, 2021

(30) Foreign Application Priority Data

Feb. 25, 2016   (DE) .................. 10 2016 202 965.7

(51) Int. Cl.
*F16K 24/04*   (2006.01)
*F16K 27/12*   (2006.01)
(Continued)

(52) U.S. Cl.
CPC .......... *F16H 57/027* (2013.01); *F16K 24/04* (2013.01); *F16K 27/12* (2013.01); *F16K 35/10* (2013.01);
(Continued)

(58) Field of Classification Search
CPC .......... F16H 57/02; F16K 24/04; F16K 24/06; F16K 27/12; F16K 15/144; F16K 15/145;
(Continued)

(56) References Cited

U.S. PATENT DOCUMENTS 2,845,090 A * 7/1958 Rost .................... H01M 50/325
                                                                137/853
3,693,651 A * 9/1972 Gifford ................ F16K 15/141
                                                                137/493
(Continued)

FOREIGN PATENT DOCUMENTS

CN     2654560 Y   11/2004
CN     2739420 Y   11/2005
(Continued)

OTHER PUBLICATIONS

Notification of Transmittal of the International Preliminary Report on Patentability dated Sep. 7, 2018, in connection with corresponding International Application No. PCT/EP2017/053669 (6 pgs).

(Continued)

*Primary Examiner* — Hailey K. Do
(74) *Attorney, Agent, or Firm* — Maier & Maier, PLLC

(57) ABSTRACT

A pressure compensation device for a housing, in particular of a motor vehicle, having at least one pressure compensation valve, which has a casing surface on the inner circumference delimiting a volume of the pressure compensation valve through which a gaseous medium can flow, a casing surface on the outer circumference facing away from the casing surface on the inner circumference, and at least one pressure compensation opening, through which the medium can flow and which is delimited by wall regions of the pressure compensation valve formed from an elastically deformable material, and having at least one protective cap.

15 Claims, 3 Drawing Sheets

(51) Int. Cl.
*F16K 35/10* (2006.01)
*F16H 57/027* (2012.01)

(52) U.S. Cl.
CPC .... *Y10T 137/7036* (2015.04); *Y10T 137/7043* (2015.04); *Y10T 137/778* (2015.04)

(58) Field of Classification Search
CPC ........ F16K 15/147; F16K 35/10; F16K 47/08; Y10T 137/7771; Y10T 137/778; Y10T 137/7882; Y10T 137/7036; Y10T 137/7043
See application file for complete search history.

(56) References Cited

U.S. PATENT DOCUMENTS 5,209,259 A * 5/1993 Dear ................ F16K 47/08
137/561 A
2004/0003846 A1 1/2004 Seidl

FOREIGN PATENT DOCUMENTS

| | | |
|---|---|---|
| CN | 102187134 A | 9/2011 |
| CN | 102865353 A | 1/2013 |
| CN | 203051707 U | 7/2013 |
| CN | 203162101 U | 8/2013 |
| CN | 204004328 U | 12/2014 |
| CN | 104343941 A | 2/2015 |
| CN | 104405859 A | 3/2015 |
| CN | 204878659 U | 12/2015 |
| DE | 10 2007 012 703 A1 | 6/2008 |
| DE | 10 2013 016 586 B3 | 11/2014 |
| DE | 10 2013 104 115 A1 | 11/2014 |
| DE | 102013016586 B3 * | 11/2014 |
| EP | 0 377 067 A1 | 7/1990 |
| EP | 2 845 457 A1 | 3/2015 |
| JP | H09-317919 A | 12/1997 |
| JP | 2001-355713 A | 12/2001 |
| JP | 2007-127139 A | 5/2007 |
| JP | 2009-162351 A | 7/2009 |
| JP | 2013-245752 A | 12/2013 |
| JP | 2014-228137 A | 12/2014 |
| WO | 2013/156887 A1 | 10/2013 |
| WO | 2015/018458 A1 | 2/2015 |

OTHER PUBLICATIONS

Examination Report dated Jan. 18, 2017 of corresponding German application No. 10 2016 202 965.7; 7 pgs.
Examination Report dated Apr. 11, 2017 of corresponding German application No. 10 2016 202 965.7; 6 pgs.
International Search Report and Written Opinion of the International Search Authority dated Apr. 26, 2017 of corresponding International application No. PCT/EP2017/053669; 14 pgs.
Chinese Office Action dated Sep. 1, 2020, in connection with corresponding CN Application No. 201780012978.1 (11 pp., including machine-generated English translation).

* cited by examiner

PRESSURE COMPENSATION DEVICE FOR A HOUSING, IN PARTICULAR OF A MOTOR VEHICLE, AND COMPONENT FOR A MOTOR VEHICLE

FIELD

The invention relates to a pressure compensation device for a housing, in particular of a motor vehicle.

BACKGROUND

Such a pressure compensation device for a housing, in particular of a motor vehicle, is already to be taken as known from DE 10 2013 016 586 B3, for example. The pressure compensation device comprises at least one pressure compensation valve, which has a casing surface on the inner circumference that delimits the volume of the pressure compensation valve through which a gaseous medium can flow. For example, the gaseous medium can be air, which, for pressure compensation, can flow through the volume and accordingly through the pressure compensation valve. The gaseous medium, for example, can flow via the pressure compensation valve or the volume out of the housing into the surroundings of the housing, as a result of which the housing is vented. This venting can prevent any excessive buildup of pressure in the housing. Accordingly, the pressure compensation valve can function as a venting valve.

Alternatively or additionally, it is conceivable that, via the pressure compensation valve or the volume, the gaseous medium or the air can flow from the surroundings into the housing, as a result of which the housing is ventilated. It is possible thereby to prevent the creation of an excessive underpressure in the housing. Accordingly, the pressure compensation valve can function as a ventilating valve. The pressure compensation valve thus ensures the pressure compensation between the housing, in particular an interior of the housing, and the surroundings of the housing or of the interior.

The pressure compensation valve further comprises a casing surface on the outer circumference facing away from the casing surface on the inner circumference and at least one pressure compensation opening through which the gaseous medium, in particular air, can flow. The pressure compensation opening opens, on the one hand, into the volume and, on the other hand, into the surroundings of the pressure compensation valve, so that the medium can flow out of the surroundings via the pressure compensation opening into the volume or out of the volume via the pressure compensation opening into the surroundings of the pressure compensation valve. In this case, the pressure compensation opening is completely delimited by wall regions of the pressure compensation valve, wherein the wall regions that completely delimit the pressure compensation opening are formed from an elastically deformable material, such as, for example, rubber.

In this way, the wall regions can free up the pressure compensation opening, as needed, in order to thereby realize a pressure compensation between the housing and the surroundings. When a pressure compensation between the housing and the surroundings does not take place, the wall regions formed from the elastically deformable material can close the pressure compensation opening, for example, in order to prevent, for example, any penetration of dirt or moisture into the volume. The pressure compensation device further comprises at least one protective cap.

Furthermore, WO 2013/156887 A1 discloses a ventilation element for a housing for the accommodation of an electrical, mechanical, or electromechanical component. CN 203051707 U, CN 104405859 A, and CN 204004328 U also each disclose ventilation elements.

SUMMARY

The object of the present invention is to further develop a pressure compensation device and a component of the kind mentioned in the beginning, in such a way that any penetration of dirt and moisture into the volume of the pressure compensation valve can be effectively prevented.

This object is achieved by a pressure compensation device. Advantageous embodiments with appropriate enhancements of the invention are presented in the rest of the claims.

A first aspect of the invention relates to a pressure compensation device for a housing, in particular of a motor vehicle, such as, for example, a passenger automobile. For example, the housing is a housing of a gearbox, such as, for example, an axle drive or differential of the motor vehicle. The pressure compensation device comprises at least one pressure compensation valve, which has a casing surface on the inner circumference delimiting a volume of the pressure compensation device through which a gaseous medium can flow; a casing surface on the outer circumference facing away from the casing surface on the inner circumference; and at least one pressure compensation opening, which is delimited completely by wall regions of the pressure compensation valve formed from an elastically deformable material and through which the medium can flow. The pressure compensation device further comprises at least one protective cap.

Now, in order to especially effectively prevent any undesired penetration of dirt and moisture into the volume of the pressure compensation valve, it is provided in accordance with the invention that the casing surface on the outer circumference is completely surrounded by the protective cap up to a subregion of the casing surface on the outer circumference arranged overlapping with a through-flow opening of the protective cap, through which the medium can flow and which has a surface lying in a range from and including 0.95 square millimeters up to and including 5 square millimeters. In other words, the protective cap has a through-flow opening and, in particular, exactly one through-flow opening through which the gaseous medium can flow. Via this through-flow opening, the gaseous medium can flow, for example, out of the surroundings of the protective cap into the protective cap and then further through the pressure compensation opening and into the volume of the pressure compensation valve. Alternatively or additionally, it is conceivable that the medium flowing through the volume flows through the pressure compensation opening and subsequently the through-flow opening and accordingly flows through the through-flow opening to the surroundings of the protective cap.

In this case, the through-flow opening has a surface, that is, a flow cross section through which the medium can flow, which lies in a range from and including 0.95 square millimeter up to and including 5 square millimeters. Furthermore, the casing surface of the pressure compensation valve on the outer circumference arranged on the inner side of the protective cap has a subregion that is arranged covering or overlapping the through-flow opening of the protective cap. Accordingly, the subregion of the casing surface on the outer circumference is not covered by the protective cap. Except for this subregion, the protective cap completely or fully surrounds the casing surface on the outer circumference of the pressure compensation valve, so that the probability that dirt and moisture penetrate into the protective cap and further into the volume can be kept especially small. Any penetration of dirt and moisture or water into the housing can be prevented thereby, so that an especially high assurance of the function of a component of the motor vehicle having the housing and the pressure compensation device can be ensured.

The invention is based, in particular, on the knowledge that the requirement placed on the impermeability or watertightness of motor vehicles is steadily increasing, with it being necessary also to drive through water with an especially great fording depth, without any excessive amount of water being able to penetrate into the housing equipped with the pressure compensation device. In particular, in the case of gushing water or when the housing dips into a cold liquid, the housing rapidly cools, so that an underpressure is created in the housing. In the case of conventional pressure compensation devices, water can be sucked into the housing via the pressure compensation valve, as a result of which the function of the component comprising the housing can be impaired. Beyond this, it was found that, in the case of conventional pressure compensation devices, a slight oil mist can deposit on the pressure compensation valve, so that an accumulation of dirt or a film of dirt can be created there.

The functionality of the pressure compensation valve can be influenced in this way. Furthermore, owing to variations in manufacturing precision of the pressure compensation valve, a complete assurance of its function cannot be ensured, in particular, when the pressure compensation valve and accordingly the wall regions are formed from rubber or a rubber blend. In the context of these variations in manufacturing precision, variations in the rubber blend as well as variations in the positioning and wear of the casting molds by means of which the pressure compensation valve is made from rubber can occur. Accordingly, in the case of conventional components, even splashed water can penetrate into the component or into the housing via the pressure compensation device thereof.

Such an undesired penetration of water into the housing can be prevented by means of the pressure compensation device according to the invention, because the pressure compensation valve, which is constructed, for example, as a rubber valve, can be effectively protected by means of the protective cap. At the same time, it is possible to ensure an adequate venting and/or ventilating of the housing, because, for pressure compensation, a sufficiently large quantity of the medium can flow through the through-flow opening in a sufficiently rapid manner. The creation of any excessive underpressure or any excessive overpressure can securely be prevented thereby. Surprisingly, it was found that the surface of the flow-through opening lying in the mentioned range makes possible, on the one hand, a fast and secure pressure compensation and, on the other hand, a very good protection against the entry of water and dirt into the housing.

Furthermore, any excessive soiling of the pressure compensation valve can be securely prevented, so that, by means of the pressure compensation device according to the invention, both any excessive entry of water into the housing and any potential property-influencing soiling of the pressure compensation valve can be securely prevented. The protective cap surrounds the pressure compensation valve at least almost completely, and accordingly prevents any direct contact of the pressure compensation valve with splashed or gushing water as well as dirt.

In an advantageous embodiment of the invention, the surface of the through-flow opening lies in a range from and including 0.95 square millimeter up to and including 3.2 square millimeters. The danger that water and dirt can penetrate into the housing can be kept especially small thereby and, at the same time, an adequate venting or ventilating of the housing can be achieved.

In another advantageous embodiment of the invention, it is provided that at least one longitudinal region of the through-flow opening tapers in the direction of the volume. In other words, the through-flow opening is, for example, conical in form at least in the mentioned longitudinal region, so that any excessive penetration of dirt and moisture into the protective cap and accordingly further into the volume can be prevented especially securely, and, at the same time, an adequate venting or ventilating of the housing can be achieved.

In order to prevent in an especially safe manner any excessive penetration of dirt and moisture into the housing, it is provided in another embodiment of the invention that the protective cap has at least two cap parts, which are joined to one another via at least one hinge and can pivot relative to one another. The protective cap can thereby be mounted especially simply, so that the danger of incorrect mounting of the protective cap and thereby resulting functional impairments of the protective cap can be prevented. Consequently, the pressure compensation valve can be protected especially effectively by means of the protective cap.

It has further been shown to be especially advantageous when the cap parts are formed in one piece with each other, wherein the hinge is constructed as a film hinge. In this case, the film hinge is formed through a reduction in the wall thickness of the cap parts that are formed in one piece with each other. In other words, in the region of the film hinge, the protective cap has a lesser wall thickness than it does as such in the region of adjoining other subregions of the protective cap, so that the cap parts are formed in one piece with each other and, in particular, are thus pivotably joined to each other via the film hinge, but can be pivoted relative to each other, in an especially simple way, around a pivot axis formed by the film hinge. An especially advantageous impermeability of the protective cap can be achieved, so that any excessive penetration of dirt and moisture into the protective cap and further into the volume can be securely prevented.

Another embodiment is characterized in that the cap parts each have connecting elements, by means of which the cap parts can be joined to each other, in particular in a form-fitting manner, and, in particular, can be locked together. In the completely manufactured state of the motor vehicle, the cap parts are joined to each other via the connecting elements and accordingly held securely together, so that the pressure compensation valve can be securely and effectively protected by means of the protective cap.

In another embodiment of the invention, the protective cap is directly joined to the pressure compensation valve in a form-fitting manner, that is, in such a manner as to physically contact the pressure compensation valve and/or to be independent of the housing. For example, the protective cap is clipped onto the pressure compensation valve or clipped into the pressure compensation valve and accordingly is preferably independent of the housing to which the pressure compensation valve is fastened, as a result of which the protective cap is able to protect the pressure compensation valve especially advantageously.

A second aspect of the invention relates to a component for a motor vehicle, such as, for example, a passenger automobile. The component comprises at least one housing and at least one pressure compensation device according to the invention. Advantages and advantageous embodiments of the pressure compensation device according to the invention are to be regarded as advantages and advantageous embodiments of the component according to the invention and vice versa.

The component is, for example, a gearbox, via which wheels of the motor vehicle can be driven. For example, the gearbox is constructed as an axle drive. The axle drive is also referred to as a differential or differential gearbox and serves the function of transmitting drive forces to the wheels of the motor vehicle and making possible speed differentiation between the wheel on the inside of the curve and the wheel on the outside of the curve. In particular, such a gearbox comes into direct contact with cold water when driving through water, as a result of which the gearbox, in particular the housing thereof, is cooled especially fast. This results in the creation of an underpressure in the housing, although this underpressure can be compensated for in an especially rapid manner via the pressure compensation device. By means of the pressure compensation device, any penetration of water into the housing and any excessive soiling of the pressure compensation device can be prevented during such driving through water, so that it is possible to provide for an especially great assurance of functional reliability of the component.

The embodiment of the wall regions that completely delimit the ventilation opening in the form of an elastically deformable material, such as, for example, rubber, is advantageous as long as the wall regions can free up the ventilation opening, which, for example, is formed as a slit, that is, a ventilation slit, during a pressure compensation between the housing and the surroundings when, during the pressure compensation, a gaseous medium, such as, for example, air, flows through the ventilation opening and, in this case, flows into the housing or out of the housing. If such a pressure compensation does not take place, however, then the ventilation opening is closed by the wall regions, for example, and fluidically blocked thereby. In consequence of a difference between a first pressure prevailing in the interior of the housing and a second pressure prevailing in the surroundings of the housing, for example, a flow of the gaseous medium occurs through the ventilation opening, as a result of which the wall regions are elastically deformed and the ventilation opening is thereby freed up. If the flow has ended, then the wall regions can elastically spring back and fluidically block the through-flow opening, for example.

It has been shown to be especially advantageous when the through-flow opening is arranged on a side of the protective cap that is directed downward in the vertical direction of the vehicle. In this way, it is possible to keep especially small the penetration of any excessive amounts of dirt and water into the protective cap and further into the volume. Furthermore, it is possible, for example, for moisture and condensed water to flow out of the protective cap through the ventilation opening owing to the force of gravity, so that any excessive accumulation of moisture in the protective cap can be prevented.

In order to especially effectively prevent any excessive accumulation of moisture in the protective cap, it is provided in another embodiment of the second aspect of the invention that the through-flow opening is arranged at the casing surface of the protective cap on the further inner circumference facing the lowest point of the casing surface on the outer circumference in the vertical direction of the vehicle. In other words, in the completely manufactured state of the motor vehicle, the pressure compensation device assumes its installed position such that, in relation to this installed position, the through-flow opening is arranged on a side of the protective cap directed downward in the vertical direction of the vehicle, with it being possible to provide, alternatively or additionally, that the through-flow opening is arranged in the vertical direction of the vehicle at the lowest point of the further casing surface on the inner circumference.

Further advantages, features, and details of the invention ensue from the following description of preferred exemplary embodiments as well as on the basis of the drawings. The features and the combination of features mentioned above in the description as well as in the features and the combinations of features mentioned below in the figure descriptions and/or shown solely in the figures can be used not only in the respectively presented combinations, but also in other combinations or alone, without departing from the scope of the invention.

BRIEF DESCRIPTION OF THE DRAWINGS

The drawing shows in.

In the figures, identical or functionally identical elements are furnished with the same reference numbers.

DETAILED DESCRIPTION

Figure 1:
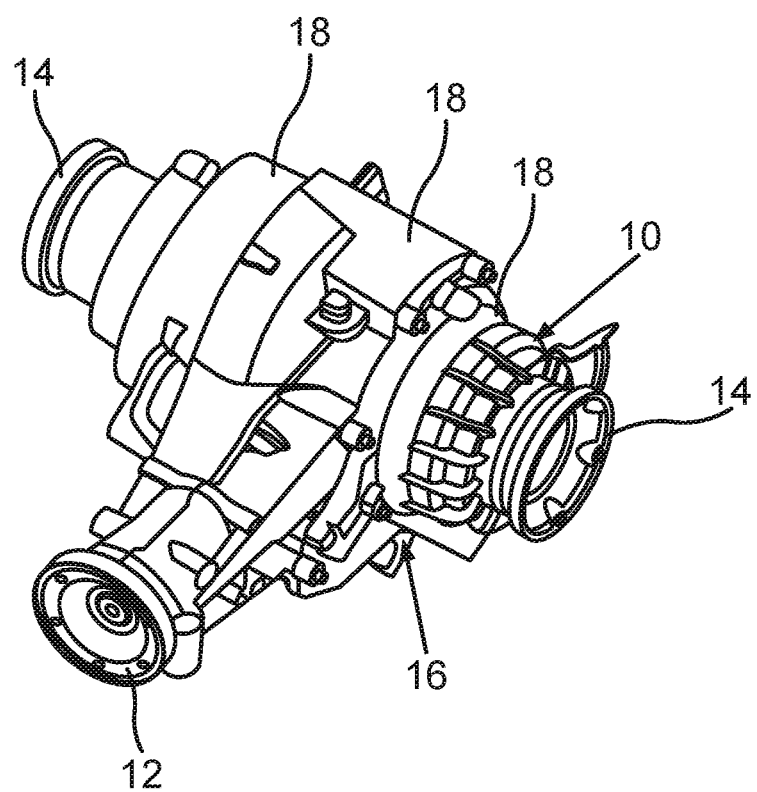
FIG. 1 a schematic and perspective plan view of a component for a motor vehicle constructed as an axle drive, having a pressure compensation device, which has at least one pressure compensation valve, whose casing surface on the outer circumference is completely surrounded by a protective cap except for a small subregion, with FIG. 1 showing a first embodiment of the pressure compensation device.

FIG. 1 shows, in a schematic and perspective plan view, a component in the form of a gearbox for a motor vehicle, in particular in the form of a passenger automobile, constructed as an axle drive 10. The axle drive 10 is a differential gearbox, by way of which wheels of the motor vehicle can be driven by a drive motor, such as, for example, an internal combustion engine. For this purpose, torques supplied by the drive motor are introduced to the axle drive 10 by way of an input shaft 12 of the axle drive 10. The axle drive 10 further comprises output shafts 14, by way of which the wheels can be driven. The axle drive 10 thus makes possible, in a way that is adequately known, the transmission of torques from the drive motor to the wheels. Furthermore, the axle drive 10 makes possible, in a way that is adequately known, a differential speed between the wheel on the inner side of the curve and the wheel on the outer side of the curve when driving around the curve.

Figure 2:
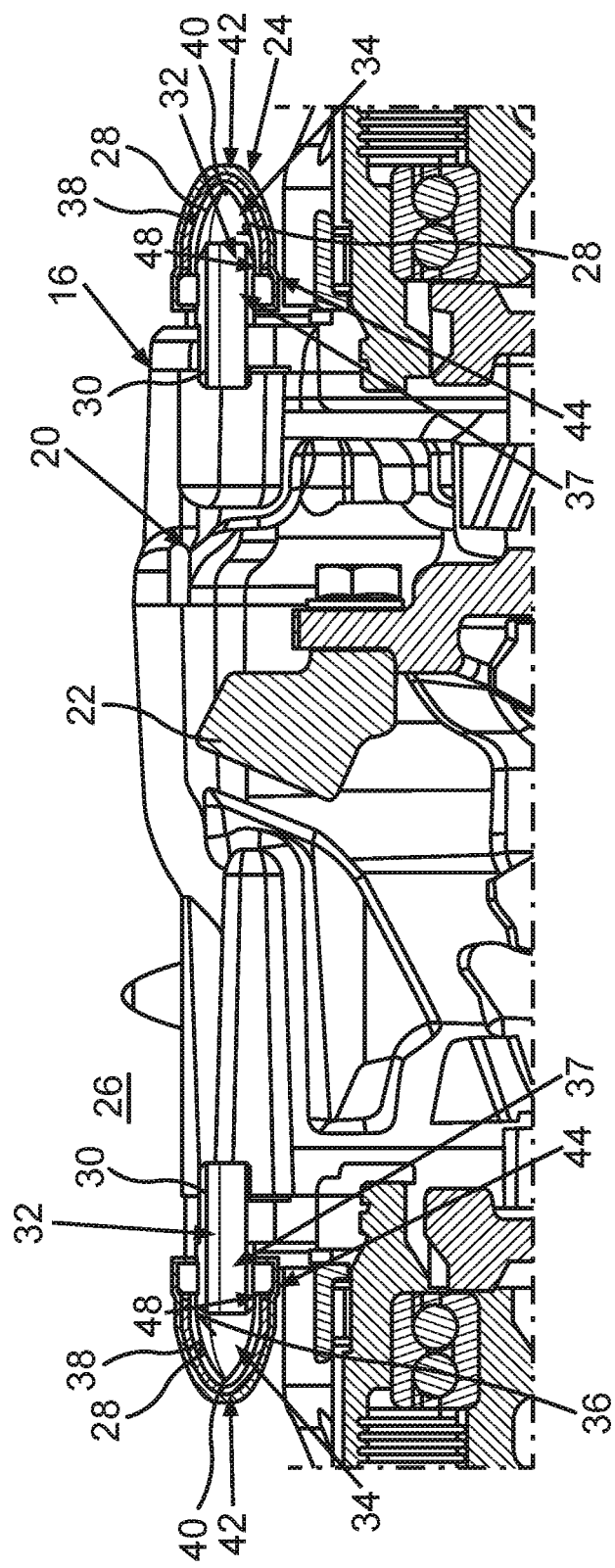
FIG. 2 in an excerpt, a schematic sectional view of the axle drive having the pressure compensation device in accordance with FIG. 1.

The axle drive 10 comprises a housing identified overall by 16, which, for example, has a plurality of housing elements 18 that are formed separately from one another and that are joined to one another. In combined view with FIG. 2, it can be seen that an interior 20, in which a plurality of gearbox elements of the axle drive 10 are accommodated, is delimited by the housing 16. These gearbox elements involve, for example, a crown wheel 22, which can be seen in the excerpt in FIG. 2 and can be driven by the input shaft 12. Furthermore, gearbox elements may involve shafts and/or gears that are engaged with one another.

The axle drive 10 further comprises a pressure compensation device, identified overall by reference 24, which ensures a pressure compensation between the interior 20 and the surroundings 26 of the housing 16. In this case, FIGS. 1 to 6 show the pressure compensation device 24 in accordance with a first embodiment. In the present case, the pressure compensation device 24 comprises two pressure compensation valves 28. Furthermore, in the present case, the pressure compensation device 24 comprises, for each pressure compensation valve 28, an at least essentially tubular channel element 30, which has a channel 32 through which a gaseous medium, such as, for example, air, can flow. On the one hand, the channel 32 opens into the interior 20. On the other hand, the channel 32 is in fluidic connection with the surroundings 26. If, for example, an overpressure is created in the housing 16, so that, in the interior 20, a first pressure and, in the surroundings 26, a second pressure, which is lower in comparison to the first pressure, prevail, then the gaseous medium, in particular air, can flow out of the interior 20 into the channel 32 and via the channel 32 into the surroundings 26.

If, in contrast, an underpressure is created in the housing 16, so that the first pressure is less than the second pressure, then, for example, air can flow out of the surroundings 26 via the channel 32 into the interior 20. Owing to the inflow of gaseous medium into the interior 20, the housing 16, in particular, the interior 20, is ventilated. Owing to the flow of gaseous medium out of the interior 20 or out of the housing 16 into the surroundings 26, the housing 16 or the interior 20 is vented. Accordingly, the respective pressure compensation valve 28 functions as a ventilating valve and/or as a venting valve, in order to ensure a pressure compensation between the surroundings 26 and the interior 20.

The respective pressure compensation valve 28 has a volume 34, through which the gaseous medium can flow and which is delimited by a casing surface 36 of the respective compensation valve 28 on the inner circumference. The respective channel 32 is in fluidic connection, on the one hand, with the respective interior 20 and, on the other hand, with the respective volume 34, so that, for example, the medium flowing out of the interior 20 first flows through the channel 32 and then, for example, flows into the volume 34 and flows through the volume 34. The respective pressure compensation valve 28 has a through-flow opening 37, by way of which the volume 34 is in fluidic connection with the channel 32. For this purpose, the channel element 30 is inserted into the through-flow opening 37 or is inserted through said opening, so that at least one longitudinal region of the channel element 30 is arranged in the pressure compensation valve 28, in particular in the volume 34. The respective pressure compensation valve 28 further has a casing surface 38 on the outer circumference facing away from the casing surface 36 on the inner circumference.

Furthermore, in the present case, the respective pressure compensation valve 28 has, on a side facing away from the through-flow opening 37, exactly one pressure compensation opening 40, through which the gaseous medium can flow and which, in the present case, is slit-shaped or is formed as a slit, that is, as a ventilation slit. In the present case, the respective pressure compensation valve 28 is constructed in one piece, with the respective pressure compensation valve 28 being formed from an elastically deformable material formed of rubber. Accordingly, the respective pressure compensation opening 40 is completely delimited by wall regions of the pressure compensation valve 28 that are formed of rubber. In this case, the wall regions 42 are formed in one piece with one another and are produced from rubber. Furthermore, the wall regions are slit, for example, with the formation of the pressure compensation opening 40 formed as a slit.

If, owing to a difference between the first pressure prevailing in the interior 20 and the second pressure prevailing in the surroundings 26, there occurs the described flow of the gaseous medium, then the wall regions 42 forming the pressure compensation opening 40 are, for example, elastically deformed and thereby moved away from one another, so that the wall regions 42 free up the respective pressure compensation opening 40. Accordingly, the gaseous medium can flow through the pressure compensation opening 40. After pressure compensation has occurred, so that the same pressure prevails in the interior 20 and in the surroundings 26, then the medium no longer flows through the pressure compensation opening 40, so that the wall regions 42 that are elastically deformed during the flow of the medium through the pressure compensation opening 40 elastically spring back into an initial state, in which the wall regions 42 are able to fluidically block the pressure compensation opening 40, for example.

The pressure compensation device 24 further comprises, for each pressure compensation valve 28, exactly one protective cap 44, which, for example, can be designed to be intrinsically rigid. The protective cap 44 is formed, for example, from a plastic, and, in contrast to the respective pressure compensation valve 28, cannot be deformed elastically or by means of a substantially greater application of force. In other words, it is preferably provided that the respective protective cap 44 is not formed from an elastically deformable material.

In FIGS. 3 to 6, as a representative of the protective caps 44, one of the protective caps 44 of the first embodiment of the pressure compensation device 24 is shown.

In order to especially effectively prevent any excessive penetration of dirt and moisture into the volume 34 and, in particular, into the interior 20 or into the housing 16, the casing surface 38 on the outer circumference is surrounded completely by the respective protective cap 44 except for a subregion 48 (FIG. 2) of the casing surface 38 on the outer circumference arranged overlapping with a flow-through opening 46 (FIG. 5) of the protective cap 44, through which the medium can flow and which has a surface that lies in a range from and including 0.95 square millimeter up to and including 5 square millimeters. In other words, the respective protective cap 44 completely encompasses or surrounds the respective casing surface 38 on the outer circumference except for the subregion 48, which is arranged so as to cover or overlap the through-flow opening 46 through which the gaseous medium can flow. In this case, the smallest surface of the through-flow opening 46 through which the gaseous medium can flow lies in a range from and including 0.95 square millimeter up to and including 5 square millimeters, so that also the subregion that is arranged overlapping the through-flow opening 46 and accordingly is not covered outward by the protective cap 44 has a surface that lies in a range from and including 0.95 square millimeter up to and including 5 square millimeters.

Figure 5:
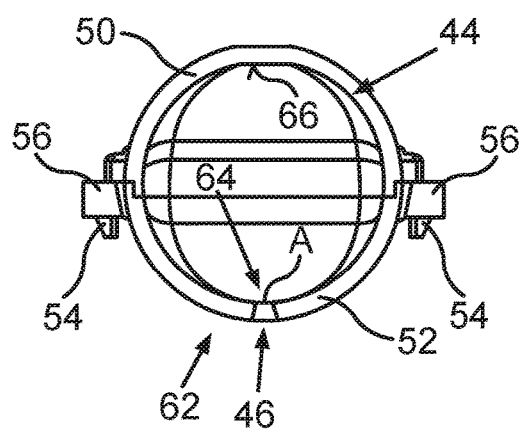
FIG. 5 a schematic sectional view of the protective cap in accordance with the first embodiment.

It can be seen from FIG. 5 that the through-flow opening 46 tapers in the direction of the volume 34 or in the direction of the casing surface 38 arranged in the protective cap 44 on the outer circumference, with the through-flow opening 46 being designed at least essentially conically. In FIG. 5, the smallest flow cross section of the through-flow opening A through which the gaseous medium can flow is indicated by A, where this flow cross section A has the aforementioned smallest surface of the through-flow opening 46 through which the gaseous medium can flow. Except for the subregion 48, the casing surface 38 on the outer circumference is surrounded or enclosed by the protective cap 44, so that the respective pressure compensation valve 28 is protected effectively by means of the respective protective cap 44. The danger that dirt and water can penetrate into the protective cap 44 and further into the volume 34 is kept especially small thereby, so that any excessive penetration of dirt and water into the interior 20 can be prevented. At the same time, however, it is possible to ensure an adequate ventilating and venting of the interior 20, because the surface of the through-flow opening 46 through which the gaseous medium can flow is at least 0.95 square millimeter and at most 5 square millimeters.

In the first embodiment, the respective protective cap 44 comprises two cap parts 50 and 52, which are constructed separately from each other and can be connected or joined to each other. The cap part 50 has at least two connecting elements 54, which can be seen in FIGS. 4 and 5 and are formed as locking hooks. Furthermore, the cap part 52 has two connecting elements 56, which are formed as locking latches and correspond with the connecting element 54, and which interact in a form-fitting manner with the connecting elements 54. The cap parts 50 and 52 lock together thereby and accordingly are joined to each other in a form-fitting manner. For connection of the cap parts 50 and 52, the connecting elements 54 (locking hooks) are inserted into the corresponding connecting elements 56 (locking latches), so that the locking hooks engage behind respective wall regions of the locking latches. The locking hooks thereby interact in a form-fitting manner with the locking latches, as a result of which the cap parts 50 and 52 are joined to each other in a form-fitting manner and are consequently locked together.

Figure 3:
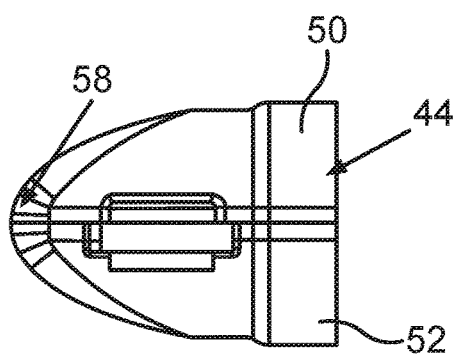
FIG. 3 a schematic side view of the protective cap in accordance with a first embodiment.

It can be seen especially well from FIG. 3 that the protective cap 44 has a shielding and drip edge 58, from which water and moisture can drip off especially well. It can be seen overall that the protective caps 44 surround the pressure compensation valves 28 at least almost completely, as a result of which the pressure compensation valves 28 are shielded from dirt and water to the full extent. Furthermore, it is provided that the protective caps 44 are directly clipped to the pressure compensation valves 28, so that the protective caps 44 are connected, via respective press connections, for example, to the pressure compensation valves 28.

Figure 4:
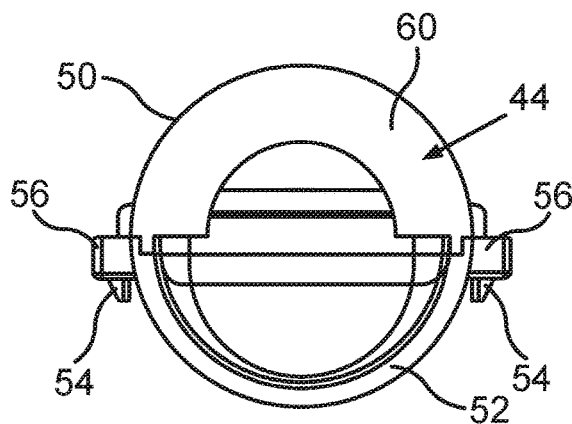
FIG. 4 a schematic rear view of the protective cap in accordance with the first embodiment.

It can be seen from FIG. 4 that at least the cap part 50 has a collar 60, which functions as a locking edge. By means of this locking edge, the respective protective cap 44 is joined in a form-fitting manner to the respective pressure compensation valve 28. For this purpose, for example, the locking edge (collar 60) engages behind at least one wall region of the respective pressure compensation valve 28, as a result of which the respective protective cap 44 is held at the respective pressure compensation valve 28. The bottom cap part 52 does not have such a locking edge and is utilized as a mounting aid for inserting the bottom cap part 52, which is constructed as a bottom shell, below the respective pressure compensation valve 28.

In order to mount the respective protective cap 44 on the respective pressure compensation valve 28, for example, the bottom cap part 52 is first slid without the cap part 50, formed as a top shell, under the respective pressure compensation valve 28. Subsequently, the top shell (top cap part 50) is placed on the respective pressure compensation valve 28 in such a way that the locking edge engages behind the wall region of the pressure compensation valve 28 and the locking hooks are inserted into the locking latches. If the cap parts 50 and 52 are joined to each other via the connecting elements 54 and 56, then the respective protective cap 44 is securely held overall at the respective pressure compensation valve 28.

In the installed position of the compensation device 24, the through-flow opening 46 is arranged on a side 62 of the protective cap 44 that is directed downward in the vertical direction of the vehicle, with the through-flow opening 46 being arranged, in particular, at the lowest point 64 of another casing surface 66 on the inner circumference of the protective cap 44 facing the casing surface 38 on the outer circumference. Accordingly, it is possible, for example, for condensate forming in the protective cap 44 to flow to the point 64 and accordingly to the through-flow opening 46, to flow through the through-flow opening 46, and thus to flow out of the protective cap 44. In this case, the pressure compensation device 24 assumes its installed position in the completely manufactured state of the motor vehicle.

Figure 6:
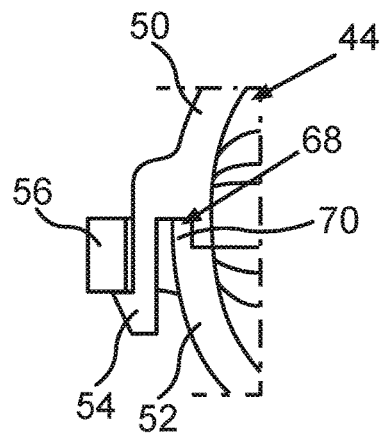
FIG. 6 in an excerpt, another schematic sectional view of the protective cap in accordance with the first embodiment.

It can be seen from FIG. 6 that the cap part 50 has a recess 68, which is formed as a groove and which functions as a sealing groove, in which a corresponding lug 70 of the bottom cap part 52 engages in a sealing manner. The cap parts 50 and 52 are thereby mutually sealed against any excessive entry of dirt and water. In addition, the groove (recess 68), which, in the present case, runs around the periphery, serves as a centering in order to position or align the cap parts 50 and 52 relative to each other. In the first embodiment shown in FIGS. 1 to 6, the cap parts 50 and 52 are constructed separately from each other and can be joined to each other or connected to each other by means of the connecting elements 54 and 56.

Figure 7:
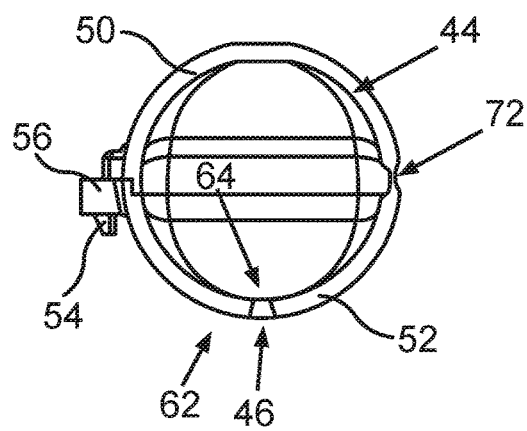
FIG. 7 a schematic sectional view of the protective cap of the pressure compensation device in accordance with a second embodiment.

FIG. 7 shows the protective cap 44 of a second embodiment of the pressure compensation device 24. In the second embodiment, the cap parts 50 and 52 are formed in one piece with each other and, in this case, are pivotably joined to each other via a hinge, which is formed as a film hinge 72, so that the cap parts 50 and 52, formed in one piece with each other, can pivot relative to each other owing to the pivot axis formed by the film hinge 72. By means of the connecting elements 54 and 56, the cap parts 50 and 52 are fixed in place on one another and thereby secured against any undesired pivoting relative to each other.

In the second embodiment, the bottom cap part 52, for example, is first slid under the pressure compensation valve 28, while the connecting elements 54 and 56 are not yet connected to each other. If the bottom cap part 52 is not in its desired position, then the top cap part 50 is snapped onto the bottom cap part 52 in such a way that the locking hook is inserted into the locking latch, as a result of which the connecting elements 54 and 56 are locked together. The locking edge (collar 60) then engages behind the mentioned wall region of the pressure compensation valve 28, as a result of which the protective cap 44 is held securely and firmly at the respective pressure compensation valve 28.

The invention claimed is:

1. A pressure compensation device for a housing of a motor vehicle, comprising:
    at least one pressure compensation valve through which a gaseous medium can flow, each of the at least one pressure compensation valves comprising:
        an inner casing surface provided on an inner circumference of the at least one pressure compensation valve, the inner casing surface delimiting a volume of the at least one pressure compensation valve;
        an outer casing surface provided on an outer circumference of the at least one pressure compensation valve, the outer casing surface facing away from the inner casing surface;
        at least one pressure compensation opening, which is delimited completely by an elastically deformable material through which the gaseous medium can flow; and
        at least one protective cap,
    wherein the outer casing surface is surrounded completely by the at least one protective cap except for a subregion of the outer casing surface, the subregion being arranged overlapping with a through-flow opening of the at least one protective cap through which the gaseous medium can flow,
    wherein the through-flow opening has an area which lies in a range from 0.95 to 5 square millimeters, and
    wherein the at least one protective cap has at least two cap parts, which are joined via at least one hinge and are pivotable relative to one another.

2. The pressure compensation device according to claim 1, wherein the at least one protective cap is directly joined in a form-fitting manner to the at least one pressure compensation valve.

3. The pressure compensation device according to claim 1, wherein at least one longitudinal region of the through-flow opening tapers in a direction towards the volume.

4. The pressure compensation device according to claim 3, wherein the at least one protective cap is directly joined in a form-fitting manner to the at least one pressure compensation valve.

5. The pressure compensation device according to claim 1, wherein the at least two cap parts have respective connecting elements, by means of which the cap parts are joinable to each other in a form-fitting manner.

6. The pressure compensation device according to claim 5, wherein the at least one protective cap is directly joined in a form-fitting manner to the at least one pressure compensation valve.

7. The pressure compensation device according to claim 1, wherein the area of the through-flow opening lies in a range from 0.95 to 3.2 square millimeters.

8. The pressure compensation device according to claim 7, wherein at least one longitudinal region of the through-flow opening tapers in a direction towards the volume.

9. The pressure compensation device according to claim 7, wherein the at least one protective cap is directly joined in a form-fitting manner to the at least one pressure compensation valve.

10. The pressure compensation device according to claim 1, wherein the at least two cap parts are formed as one piece, and
    wherein the at least one hinge is designed as a film hinge.

11. The pressure compensation device according to claim 10, wherein the at least two cap parts have respective connecting elements, by means of which the cap parts are joinable to each other in a form-fitting manner.

12. The pressure compensation device according to claim 10, wherein the at least one protective cap is directly joined in a form-fitting manner to the at least one pressure compensation valve.

13. A component for a motor vehicle, having at least one housing and having at least one pressure compensation device according to claim 1.

14. The component according to claim 13, wherein the through-flow opening is arranged on a side of the at least one protective cap that is directed downward in a vertical direction of the motor vehicle.

15. The component according to claim 13, wherein the through-flow opening is arranged in a vertical direction of the motor vehicle at a lowest point of another a first casing surface on an inner circumference of the at least one protective cap facing a second-casing surface on an outer circumference of the at least one protective cap.

* * * * *